United States Patent
Crowhurst

(10) Patent No.: US 9,386,830 B2
(45) Date of Patent: Jul. 12, 2016

(54) WALKING AID DEVICE

(71) Applicant: HURRYWORKS, LLC, Port Washington, NY (US)

(72) Inventor: Christopher Crowhurst, Minnetonka, MN (US)

(73) Assignee: HURRYWORKS LLC, Port Washington, NY (US)

( * ) Notice: Subject to any disclaimer, the term of this patent is extended or adjusted under 35 U.S.C. 154(b) by 0 days.

(21) Appl. No.: 14/504,810

(22) Filed: Oct. 2, 2014

(65) Prior Publication Data

US 2016/0095397 A1 Apr. 7, 2016

(51) Int. Cl.
*A45B 9/04* (2006.01)
*A45B 9/00* (2006.01)
*A61H 3/02* (2006.01)

(52) U.S. Cl.
CPC ... *A45B 9/00* (2013.01); *A45B 9/04* (2013.01); *A61H 3/0277* (2013.01); *A61H 3/0288* (2013.01); *A45B 2009/005* (2013.01)

(58) Field of Classification Search
CPC ..... A45B 9/04; A61H 3/0288; A61H 3/0277; A61H 2003/0283
USPC .......................................... 135/77, 82, 84, 86
See application file for complete search history.

(56) References Cited

U.S. PATENT DOCUMENTS

| | | | |
|---|---|---|---|
| 679,468 A * | 7/1901 | Pratt | A61H 3/0288 114/79 R |
| 765,984 A * | 7/1904 | Morris et al. | 135/84 |
| 1,369,580 A | 2/1921 | Uchytil | |
| 2,403,632 A * | 7/1946 | Brown | 135/84 |
| 2,453,742 A | 11/1948 | Bowen et al. | |
| 2,538,658 A | 1/1951 | Saurer | |
| 2,606,568 A * | 8/1952 | Walcot | A61H 3/0288 135/80 |
| 2,753,586 A | 7/1956 | Metz | |
| 3,163,437 A | 12/1964 | William | |
| 3,199,886 A * | 8/1965 | Dover | A63C 11/222 135/84 |
| 3,731,698 A | 5/1973 | Buchalter | |
| 4,044,784 A | 8/1977 | Smith | |
| 4,135,536 A | 1/1979 | Willis | |
| 4,440,186 A | 4/1984 | Lottner | |
| D288,052 S | 2/1987 | Daenen et al. | |
| D305,702 S | 1/1990 | Taliani et al. | |
| 4,899,771 A | 2/1990 | Wilkinson | |
| 4,947,882 A | 8/1990 | Levasseur | |
| D334,314 S | 3/1993 | Milton | |

(Continued)

FOREIGN PATENT DOCUMENTS

| | | |
|---|---|---|
| CA | 449581 | 7/1948 |
| DE | 4108834 | 9/1992 |
| GB | 1181795 | 2/1970 |

OTHER PUBLICATIONS

U.S. Appl. No. 29/451,763, filed Apr. 8, 2013, Crowhurst.

(Continued)

*Primary Examiner* — Noah Chandler Hawk

(57) ABSTRACT

A walking aid, such as a cane, can be equipped with one or more features and structures for increasing durability and structural integrity, providing increased mobility and support for users, aiding with common tasks, and providing an all-around improved user experience. Additionally, the walking aid can be constructed to include multiple detachable and collapsible segments for easy storage and transportability of the walking aid.

14 Claims, 13 Drawing Sheets

(56) References Cited

U.S. PATENT DOCUMENTS

| | | | |
|---|---|---|---|
| 5,390,687 A * | 2/1995 | Tsai | 135/65 |
| 5,640,986 A | 6/1997 | Herman | |
| 5,711,334 A | 1/1998 | Roux | |
| 5,782,256 A * | 7/1998 | Bradley | A61H 3/04 135/77 |
| 5,794,638 A * | 8/1998 | Richey et al. | 135/65 |
| 5,865,204 A | 2/1999 | Bracy | |
| D411,653 S | 6/1999 | Richey et al. | |
| 6,601,818 B1 | 8/2003 | Larsen | |
| 6,883,530 B2 | 4/2005 | Kawakami et al. | |
| D511,889 S | 11/2005 | Cockrell | |
| 7,047,990 B2 | 5/2006 | Zambrano et al. | |
| D558,886 S | 1/2008 | Chen | |
| D570,094 S | 6/2008 | Wainwright | |
| D576,402 S | 9/2008 | White | |
| D587,003 S | 2/2009 | Shinohara | |
| D587,894 S | 3/2009 | Wainwright | |
| 7,581,556 B2 | 9/2009 | Haslach, Jr. et al. | |
| 7,588,044 B2 | 9/2009 | Baker | |
| 7,611,413 B2 | 11/2009 | Ryan et al. | |
| 7,637,274 B1 | 12/2009 | Dodson | |
| 7,647,937 B2 | 1/2010 | Gordon | |
| D618,453 S | 6/2010 | Jiang | |
| 7,748,396 B2 | 7/2010 | Lasota | |
| D627,150 S | 11/2010 | Chao | |
| D627,898 S | 11/2010 | Aulwes et al. | |
| D632,476 S | 2/2011 | Owens et al. | |
| D635,224 S | 3/2011 | Rigolio | |
| D635,351 S | 4/2011 | White | |
| 8,166,990 B2 | 5/2012 | Daily | |
| 8,176,927 B2 | 5/2012 | Wu | |
| D666,353 S | 8/2012 | Lin et al. | |
| D668,447 S | 10/2012 | Lai | |
| D670,077 S | 11/2012 | Jiang | |
| D680,826 S | 4/2013 | Patel et al. | |
| D683,196 S | 5/2013 | Natkiel | |
| 8,596,288 B2 | 12/2013 | Daily | |
| 8,671,962 B1 | 3/2014 | Dodson | |
| 8,707,975 B2 | 4/2014 | Larson et al. | |
| 8,746,266 B2 * | 6/2014 | Palmer | A45B 9/04 135/82 |
| 9,226,556 B1 * | 1/2016 | Chien | A61H 3/0288 |
| 2006/0219280 A1 | 10/2006 | Robinson et al. | |
| 2006/0254632 A1 | 11/2006 | Willis | |
| 2013/0032185 A1 | 2/2013 | Sato | |
| 2013/0291913 A1 | 11/2013 | Soletski et al. | |
| 2015/0374082 A1 * | 12/2015 | Austin | A45B 9/04 135/77 |

OTHER PUBLICATIONS

U.S. Appl. No. 13/858,680, filed Apr. 8, 2013, Crowhurst.

"The HurryCane As Seen on TV—Foldable Walking Cane that Stands on its Own with 3 Points of Contact," thehurrycane.com, Jun. 7, 2012, retrieved on Oct. 13, 2014, https://web.archive.org/web/20120607055811/http://thehurrycane.com/(S(06b99a2f1a264eec9d6b7253cf0f33a4)/, 2 pages.

HurryCane Setup Instructions, 2012, 2 pages.

HurryCane Certificate of Authenticity, 2013, 2 pages.

HurryCane Freedom Edition Setup Instructions, Oct. 2013, 2 pages.

International Search Report and Written Opinion in International Application No. PCT/US2013/036181, mailed Feb. 13, 2014, 14 pages.

* cited by examiner

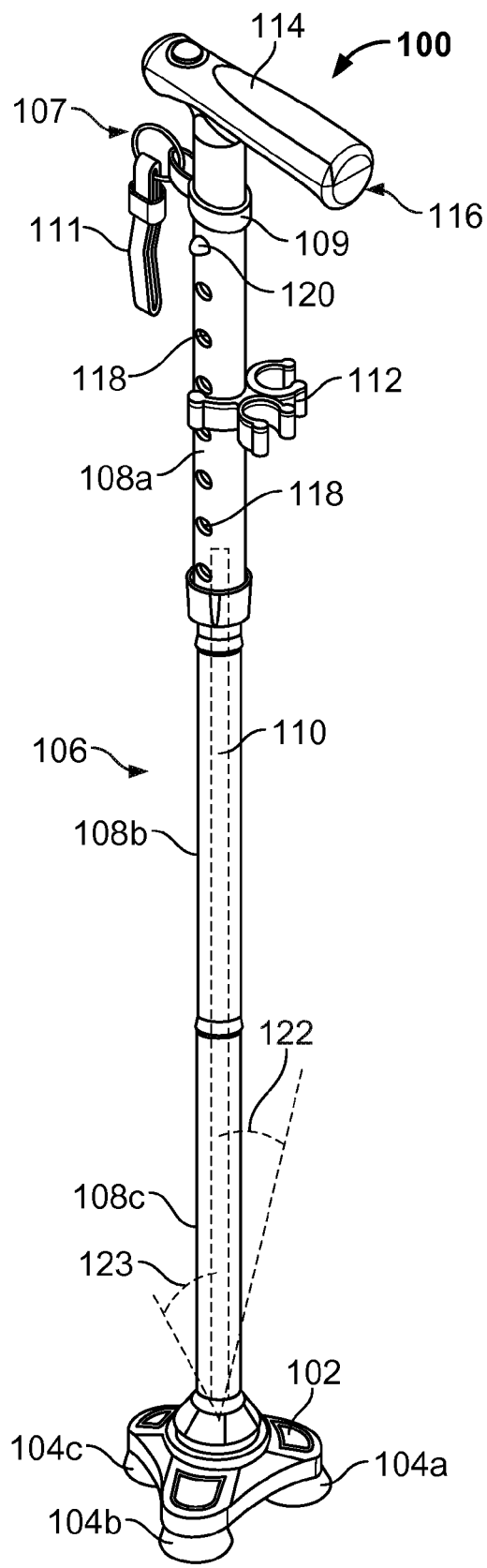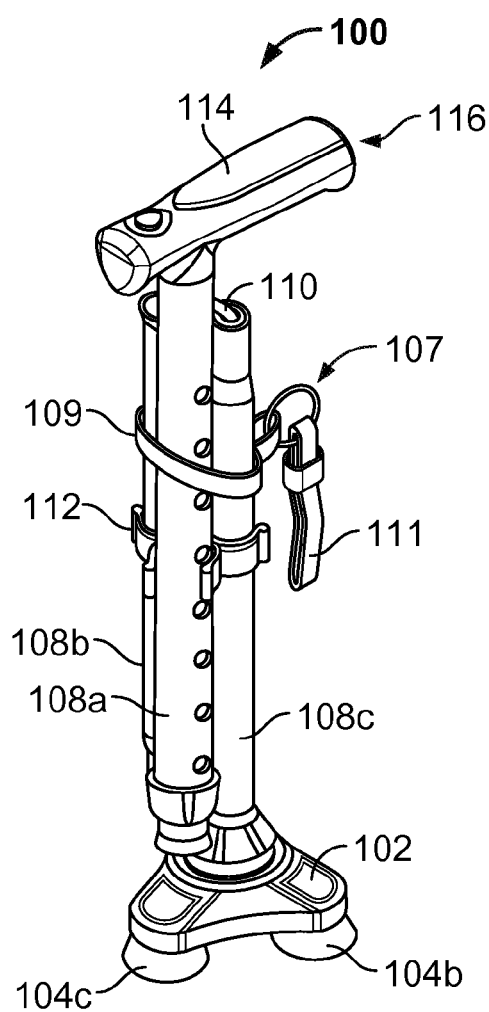
FIG. 1A
FIG. 1B

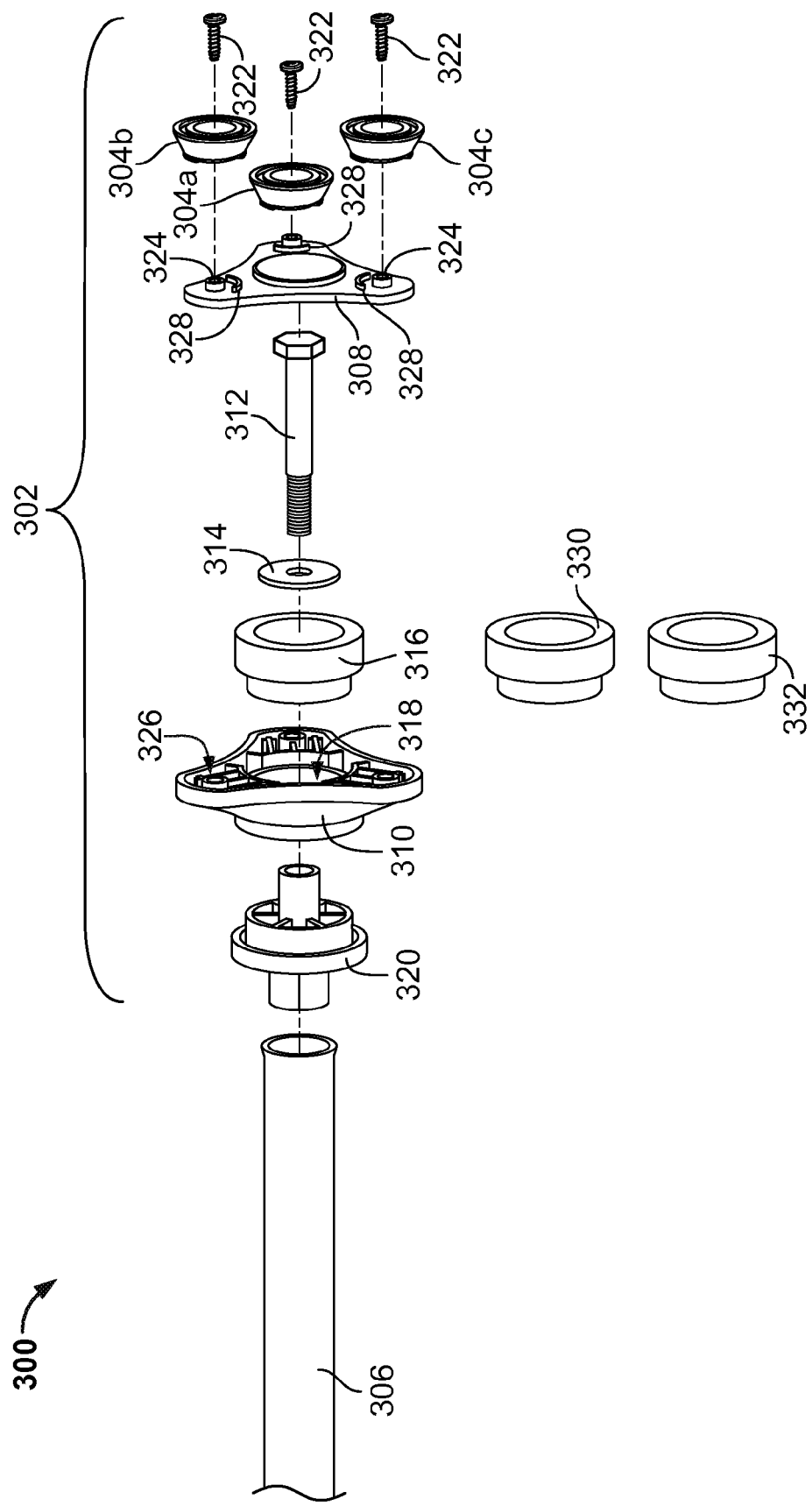

WALKING AID DEVICE

TECHNICAL FIELD

This disclosure relates to mechanical mobility aid devices, such as walking canes or the like.

BACKGROUND

Mobility aid devices allow individuals with mobility problems to more easily move between locations and conduct their daily lives without assistance from care workers. Mobility aid devices can also help individuals to engage in physical activities for longer periods of time or engage in activities that would not be possible without the help of the mobility aid devices. Different mobility aid devices help with different activities and also offer differing levels of transportability and ease of use. Some mobility aid devices, such as, for example, walkers provide a greater level of support for those in need of such support. Other mobility aid devices, such as, for example, canes, can provide aid with locomotion and walking while also providing benefits such as ease of transportation and storage.

SUMMARY

Some embodiments of a mobility aid device, such as a cane, can include features for any or all of increasing durability and structural integrity, providing increased mobility and support for users, aiding with common tasks, and providing an improved user experience. In particular embodiments, the mobility aid device is provided in the form of a multi-direction articulable walking cane that is configured to stand on its own when not is use and configured to flexibly adjust an angular relationship between the shaft and the base during normal use (e.g., flexible articulation with multiple degrees of freedom relative to the base). Additionally, the cane can be equipped with one or more mechanical and/or communication features (described in detail below) that provide enhance convenience and durability.

Some embodiments described herein include an apparatus for aiding walking along a surface. The apparatus may include a handle for engaging a hand of a user of the apparatus. Also, the apparatus may include a shaft coupled to the handle at a first end and extending away from the handle, and the shaft can include one or more shaft sections, which may be selectively detachable from one another to adjust to a collapsed configuration. The apparatus may further include a base coupled to the shaft at a second end of the shaft. The apparatus may also include at least one footpad coupled to the based, and the footpad may have a notch configured to receive a tab extending from the base. The tab may be configured to prevent rotation of the at least one footpad with respect to the base when the at least one footpad is coupled to the base.

Particular embodiments described herein include an apparatus for aiding walking along a surface. The apparatus may include a foot to interface with the surface, and the foot can be rigid to resist bending during walking. The apparatus may also include a shaft configured to couple with the foot at a first end of the shaft, and a nut positioned within an internal cavity of the shaft. The apparatus may further include a bolt extending through an aperture of the foot and into the internal cavity of the shaft and at least partially extending into an aperture of the nut. The nut may include a plurality of wings configured to engage an internal surface of the internal cavity of the shaft and to embed into the internal surface when the bolt is tightened with respect to the nut.

Some embodiments of a walking aid include a handle for engaging a hand of a user of the walking aid, and a shaft coupled to the handle at a first end and extending away from the handle. The shaft may include a plurality of removably connectable shaft sections. The walking aid may also include a foot configured interface with a walking surface and coupled to the shaft at a second end of the shaft. The walking aid may further include a wrist strap having an elastically stretchable first portion and a second portion that has an elasticity different from the first portion and that is coupled to the first portion. The elastically stretchable first portion may be configured to encompass at least two shaft sections of the plurality of shaft sections when the walking aid is in a collapsed configuration, and the elastically stretchable first portion may be further configured to secure to a single shaft section of the plurality of the plurality of shaft sections when the walking aid is in an operative configuration.

In various embodiments described herein, an apparatus for aiding walking along a surface may include a handle for engaging a hand of a user of the apparatus. Also, the apparatus may include a shaft coupled to the handle at a first end and extending away from the handle, and the shaft may include one or more shaft sections (which, optionally, may be removably connectable to axially align with one another). The apparatus may further include a foot configured interface with a walking surface and coupled to the shaft at a second end of the shaft. Additionally, the apparatus may include at least one light for lighting a walking path of the user of the apparatus.

In some embodiments, a walking aid system may include a walking aid and a particularly configured packaging. The walking aid may include a handle for engaging a hand of a user of the walking aid, a shaft coupled to the handle at a first end and extending away from the handle, and a foot configured interface with a walking surface and coupled to the shaft at a second end of the shaft. The packaging may be affixed to the walking aid by one or more fasteners, and the packaging may be configured to support the walking aid in a hanging position by engaging a hook. At least a portion of the foot may be exposed and extend below a lowermost edge of the packaging. The foot may be configured to support the walking aid and the packaging in a vertically upright orientation when the walking aid is affixed to the packaging.

In particular embodiments described herein, a walking aid system may include a walking aid and a set of interchangeable flexible joint members. The walking aid may include a foot to interface with a walking surface. Optionally, the foot may be rigid to resist bending during walking. The walking aid may also include a shaft extending upwardly from the foot, and a handle coupled to an upper end of the shaft. The set of interchangeable flexible joint members may be each sized to individually fit within an interior space defined by the foot. Each flexible joint member of the set of interchangeable flexible joint members may have a peripheral edge configured to mate with the interior space of the foot and also may have a central portion configured to mount with the shaft. Each flexible joint member of the set of interchangeable flexible joint members may be elastically bendable to permit angular articulation of the shaft with respect to the foot in response to a load applied to the handle. At least a first flexible joint member of the set of interchangeable flexible joint members may have a different degree of flexibility than a second flexible joint member of the set of interchangeable flexible joint members.

Some embodiments of an apparatus for aiding walking along a surface may include a handle for engaging a hand of a user of the apparatus, and a shaft coupled to the handle at a first end and extending away from the handle. The shaft may include one or more shaft sections (which, optionally, may be removably connectable to axially align with one another). Also the apparatus may include a base coupled to the shaft at a second end of the shaft. The shaft may further include at least one footpad coupled to the base, and the footpad may optionally have concentric rings of raised and recessed portions.

Some or all of the embodiments described herein may provide one or more of the following advantages. First, in some embodiments, a walking aid can be constructed to include multiple detachable and collapsible segments for easy storage and transportability of the walking aid.

Second, particular embodiments of a walking aid can include a flexible puck at a junction of a base and a shaft of the walking aid provide for improved contact between the base and the ground when in use on angled surfaces. In some implementations, the walking aid can be part of a walking aid kit, which may include multiple flexible pucks of various degrees of flexibility to allow the flexible pucks to be swapped out such that a user of the walking aid kit can customize a degree of flexibility of a junction of a base and a shaft of the walking aid.

Third, some embodiments of a walking aid can include footpads having a lower engagement structures for improving contact on uneven surfaces. In one example, the footpads may include concentric rings for improving contact on uneven surfaces, including carpeted surfaces. Additionally, the footpads of the walking aid may optionally include securing notches configured to mate with tabs of a base of the walking aid so as to prevent rotation and accidental detachment of the footpads. In another example, a walking aid can include footpads having rubber spike extensions for improving contact on uneven surfaces.

Fourth, in some embodiments described herein, a walking aid can include a securing nut having metal wings for anchoring into an internal cavity of a shaft of the walking aid so as to more firmly secure the shaft to a base of the walking aid. Alternatively or additionally, a walking aid can include a securing nut having fins that expand when engaged by a screw to securely affix a handle of the walking aid to a shaft of the walking aid.

Fifth, a walking aid can include one or more lights for light a path of a user of the walking aid. In some implementations, the walking aid can further include a light sensor for detecting environmental light and a contact detection pad for detecting that a user has her hand placed on the handle of the walking aid. The one or more lights can be configured to turn on when the light sensor detects that environmental light is below a threshold level and that a user is contacting the handle of the walking aid. Alternatively or additionally, the walking aid can also include one or more manual light switches for controlling activation of the one or more lights.

Sixth, in various embodiments described herein, a walking aid can be packaged in a collapsed condition such that the walking aid can be hung on a display rack by the packaging, or placed on a display shelf such that a base of the walking aid supports the walking aid and the packaging on a shelf.

Seventh, in some optional configurations, a walking aid can a number of structures that provide improved convenience to the user. For example, the walking aid can include a hook attachment to aid a user in carrying a bag (e.g., a grocery bag). In another example, the walking aid can include a GPS transponder to allow the location of the walking aid, or a person in possession of the walking aid to be readily determined (e.g., by a caretaker searcher for the user). Alternatively or additionally, the walking aid can further include a wireless communications device for communicating with networked computing devices, a controller for controlling the wireless communications device and the GPS transponder, and a battery for powering the electronic components. Alternatively or additionally, the walking aid can include a pedometer for tracking the activity of a user of the walking aid.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1A is an elevated front right perspective view of an example walking aid.

FIG. 1B is an elevated front left perspective view of the example walking aid of FIG. 1A in a collapsed configuration.

FIG. 6 is an exploded view of components of a base and a shaft of an example walking aid and replacement flexible pucks for the example walking aid.

Like reference symbols in the various drawings indicate like elements.

DETAILED DESCRIPTION OF ILLUSTRATIVE EMBODIMENTS

Figure 1C:
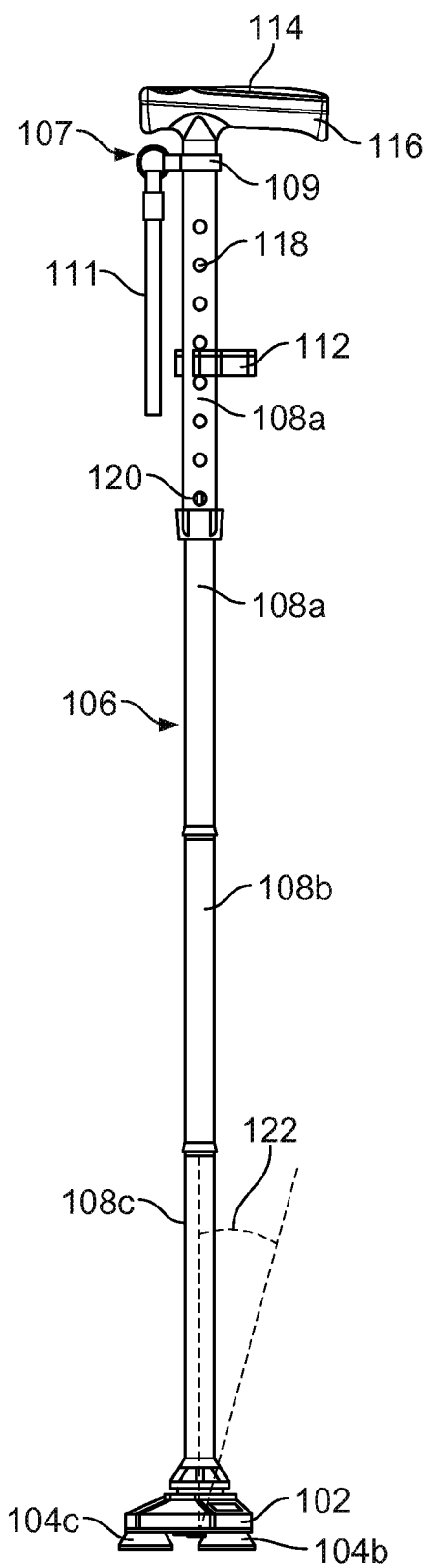
FIG. 1C is a side view of the example walking aid of FIG. 1A in an extended configuration.

Referring now to FIGS. 1A-D, some embodiments of a walking aid 100 can have a configuration of walking cane that is configured to stand on its own when not is use and configured to provide multi-directional angular articulation between the shaft and the base during normal use (e.g., flexible articulation that operates as a mobile joint). In some embodiments, the walking aid 100 can be readily adjusted between an operative configuration (FIG. 1A) and a collapsed configuration (FIG. 1B) in which it can conveniently stowed in a purse, bag, or the like. Additionally, the walking aid 100 can be equipped with one or more optional features that provide enhance convenience and/or durability.

Referring to FIG. 1A, the walking aid 100 includes a base 102 having three footpads 104a-c. The footpads 104a-c can, for example, be constructed from an elastomeric material, such as vulcanized rubber. In this embodiments, the base 102 includes the three footpads 104a-c to provide a wide contacting surface for contacting the ground when the walking aid 100 is in use. Other embodiments of the walking aid 100 can include four or more footpads. As previously described, the walking aid can be readily and manually adjusted between an operative configuration (in which a shaft 106 is extended, as shown, for example, in FIG. 1A) and a collapsed configured (in which the shaft is not extended, as shown, for example, in FIG. 1B). In this embodiment, the shaft 106 comprises three shaft sections 108a-c. The three shaft sections 108a-c are configured to engage each other to form the ridged shaft 106 in the operative configuration. The walking aid 100 further includes an elastically flexible cable 110 that extends through at least portions of the shaft sections 108a-c to bias the shaft sections 108a-c to each other (and into axial alignment) to form the rigid shaft 106 in the operative configuration. The cable 110 has elastic properties to allow the shaft sections 108a-c to be detached from each other such that the shaft sections 108a-c can be pulled apart (in the axial direction) to permit the walking aid 100 to be collapsed as shown, for example, in FIG. 1B where the shaft sections 108a-c are retained in a side-by-side arrangement. The cable 110 biases the shaft sections 108a-c toward an axially aligned and mechanically nested connection to each other while allowing the shaft sections 108a-c to be manually repositioned with respect to one another such that the walking aid 100 can be collapsed. The elastic properties of the cable 110 further facilitate transitioning from the collapsed configuration shown in FIG. 1B to the operative configuration shown in FIG. 1A by drawing the shaft sections 108a-c together. For example, when the shaft sections 108a-c are arranged in the configuration as shown in FIG. 1B but then no longer bound or restrained, the user can readily grasp the handle 116 and lift or otherwise move the walking aid 100 to thereby cause the shaft sections 108a-c to automatically shift into the axially aligned and mechanically nested connections as shown in FIG. 1A under the spring bias force from the internal cable 110. Such as configuration can be significantly helpful to many user's that may not have the full range of motion or strength required to otherwise manually assemble various components of a cane or other walking aid.

Referring to FIG. 1B, a clip 112 can engage the shaft sections 108a-c to secure the shaft sections 108a-c to each other when the walking aid 100 is in the collapsed configuration shown in FIG. 1B. When the walking aid 100 is in an operative configuration as shown in FIG. 1A, the clip 112 can secure to one of the shaft sections 108a-c so that the clip 112 is readily available to secure the shaft sections 108a-c in the collapsed configuration when desired. For example, as shown in FIG. 1A, the clip 112 is affixed to the shaft section 108a when the walking aid 100 is in an operable sate.

Additionally or alternatively, the walking aid 100 can be equipped with a strap 107 that includes an elastically stretchable portion 109 configured to engage the shaft 106 of the walking aid 100. The stretchable portion 109 has elastic properties to allow the stretchable portion 109 to snuggly engage the shaft section 108a (or any of other shaft sections 108b-c) when the walking device is in the operative configuration depicted in FIG. 1A, while also allowing the stretchable portion 109 to elastically deform so as to engage (and wrap around) all three shaft sections 108a-c when the walking aid is in the collapsed configuration shown in FIG. 1B. The stretchable portion 109 can apply pressure to the shaft sections 108a-c to hold the shaft sections 108a-c in the collapsed configuration. The strap 107 can be used in conjunction with or in place of the clip 112 to hold the walking aid 100 in the collapsed configuration. The strap 107 further includes a wrist engaging portion 111 that a user of the walking aid 100 can wrap around her wrist or hold in her hand. The wrist engaging portion 111 of the strap 107 can allow the user to easily carry the walking aid 100 when in the collapsed configuration and can also help prevent the walking aid 100 from falling to the ground if the user should lose hold of a handle 116 of the walking aid 100 when the walking aid 100 is in the operative configuration. In some implementations, the wrist engaging portion 111 is significantly less elastically stretchable (or otherwise does not have elastic properties) than the stretchable portion 109 (which does have the previously described elastic properties).

Figure 1D:
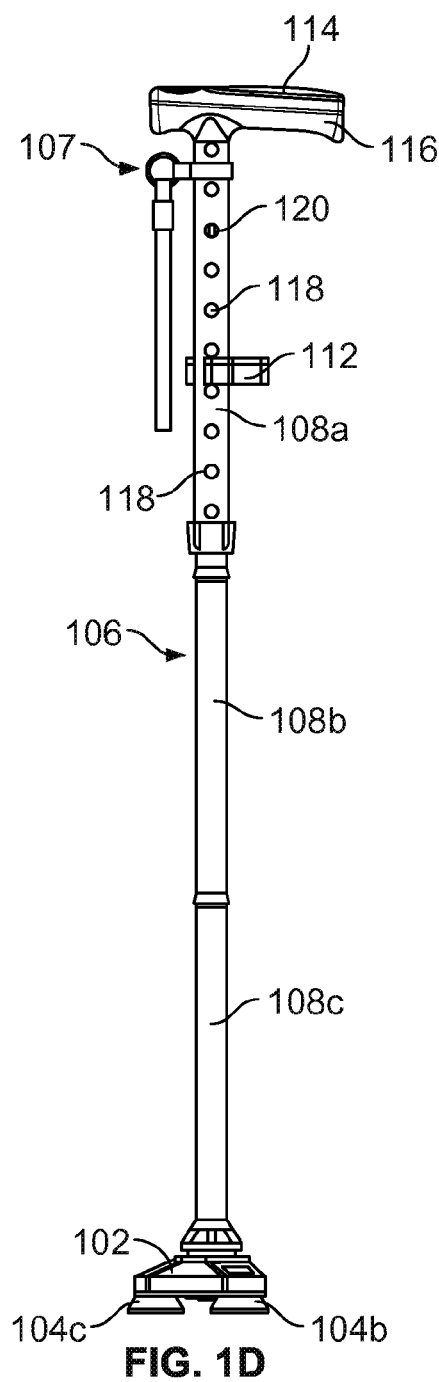
FIG. 1D is a side view of the example walking aid of FIG. 1A in a retracted configuration.

Referring again to FIGS. 1A-D, the walking aid 100 includes an ergonomic grip 114 coupled to a top portion of a handle 116. The grip 114 can extend horizontally across a top portion of the handle 116 (when the shaft section 108a extends vertically). The handle 116 is affixed to the shaft section 108a. The shaft section 108a can be adjustably extendable. For example, the shaft section 108a can include a plurality of height adjustment holes 118. The shaft section 108a can further include a depressible button 120 that is spring-biased to extend outwardly from an adjacent one of the plurality of holes 118. FIG. 1C shows the depressible button 120 extending through one of the holes 118 such that the walking aid is in an extended height configuration. FIG. 1D shows the depressible button 120 extending through a different one of the holes 118 such that the walking aid is in a lower-height (or partially retracted) configuration in comparison to the configuration shown in FIG. 1C.

As shown in FIG. 1C, the base 102 can be wider than the shaft 106 to resist tipping. Additionally, a junction of the base 102 and the shaft section 108c can include a flexible joint member (such as a flexible puck described in more detail below with respect to FIG. 6) to allow the footpads 104a-c to engage a flat or uneven surface (e.g., the floor, ground, grass, sidewalk, etc.) while the shaft 106 extends away from the base 102 such that the shaft 106 and the engaged surface form a non-perpendicular angle. For example, the shaft 106 is biased to extend generally perpendicularly relative to the width of the base 102 but can be adjusted at the flexible joint member in multiple degrees of freedom (e.g., angularly articulated in in multiple directions such as articulated angles 122 and 123) with respect to the base 102. This allows the footpads 104a-c to rest flush with a support surface even when the shaft 106 of the walking aid 100 is articulated to a non-perpendicular angle relative to the support surface (which may occur, for example, when the user is walking up stairs with the walking aid 100 or during other uses). The flexible joint member can allow the shaft 106 to extend from the base 102 and multiple different angles, somewhat like a ball-and-socket motion with a bias to a generally vertical orientation. In some implementations, the flexible joint member can limit the maximum angle formed by the shaft 106 and the base 102. For example, the flexible joint member can limit the angle formed by the shaft 106 and the base 102 to a maximum angle of 15 degrees (e.g., one or both of the articulation angles 122 and 123 are limited to 15 degrees or less).

Figure 2:
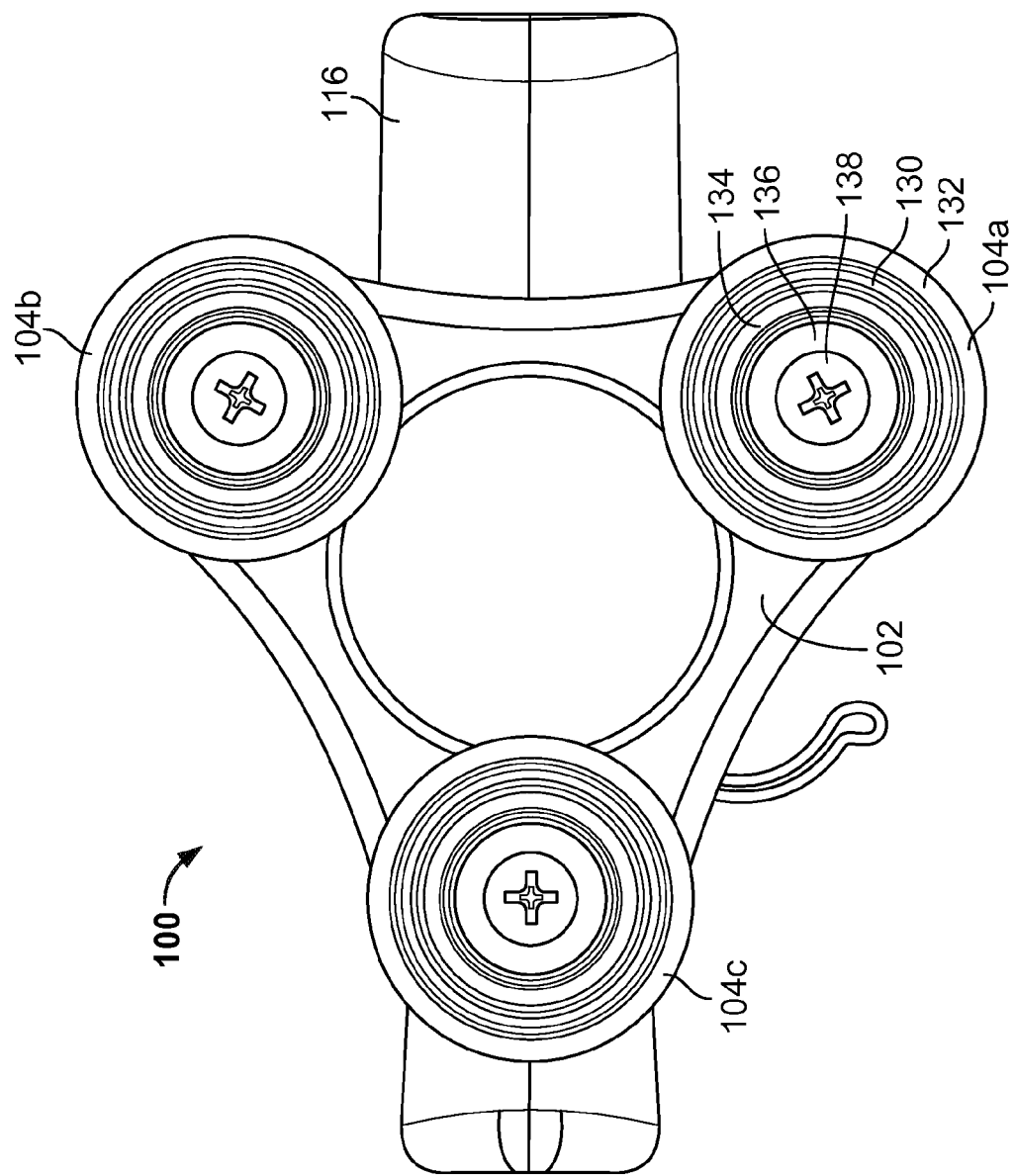
FIG. 2 is a bottom view of the example walking aid of FIG. 1A.

Referring now to FIG. 2, in the example shown, the footpads 104a-c of the walking aid 100 include concentric rings on their bottom surfaces for improving contact between the footpads 104a-c with uneven support surfaces, such as carpet (including shag carpet), grass, gravel, etc. The footpad 104a includes a circular groove 130 defined by an outer circular extending portion 132 and an inner circular extending portion 134. The circular groove 130 is defined by walls of the circular extending portions 132 and 134. The footpad 104a includes a recessed center portion 136 for receiving a screw 138. The screw 138 is used, for example, to affix the footpad 104a to the base 102 of the walking aid 100. The recessed center portion 136 receives the screw 138 such that the head of the screw 138 does not extend beyond the inner circular extending portion 134. Thus the head of the screw 138 is prevented from contacting a support surface positioned beneath the walking aid 100, allowing the circular extending portions 132 and 134 to make contact with the support surface. The improved contact with uneven support surfaces provided by the circular extending portions 132 and 134 and the circular groove 130 can provide increased stability for the walking aid 100.

Figure 3A:
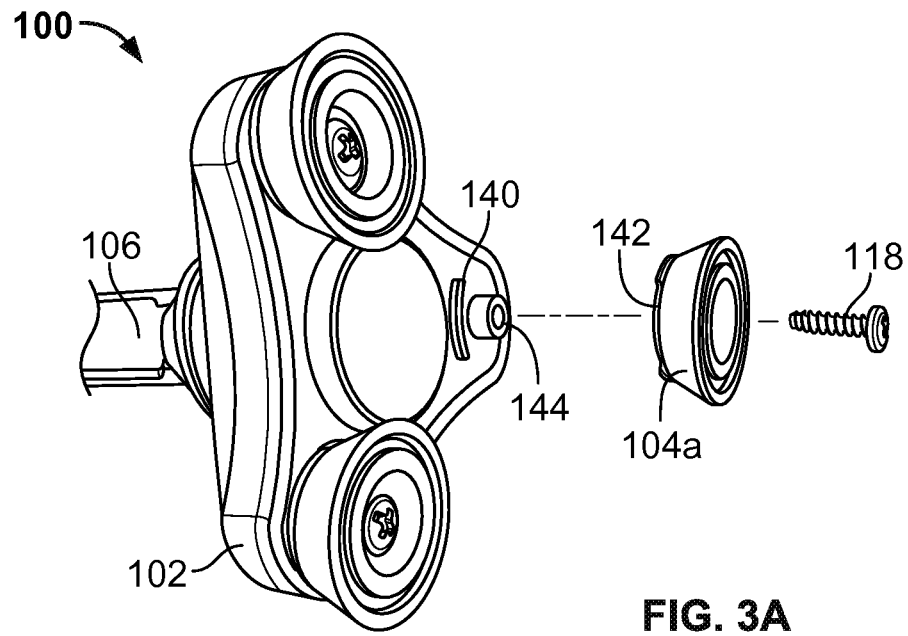
FIG. 3A is an exploded view of a footpad in relation to a base of an example walking aid.
Figure 3B:
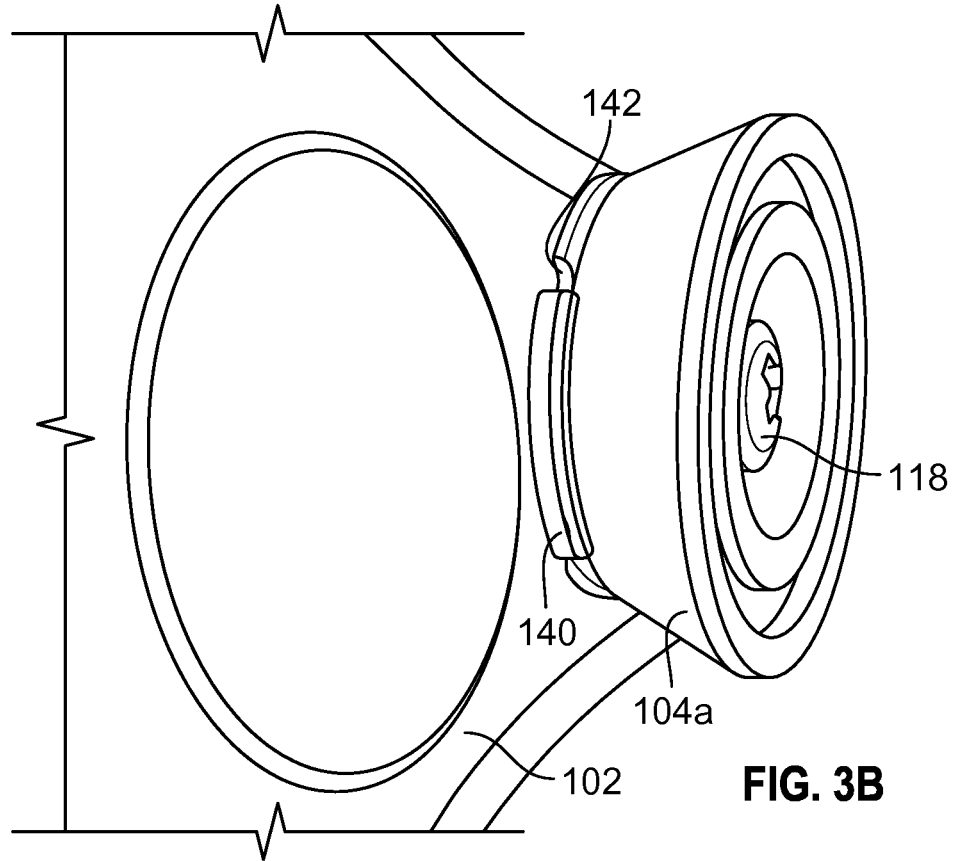
FIG. 3B is a perspective view of the foot bad and base of the example walking aid of FIG. 3A in an assembled configuration.

Referring now to FIGS. 3A-B, in some embodiments described herein the base 102 includes a tab 140 extending from a bottom surface of the base 102 for engaging a corresponding notch 142 of the footpad 104a. The base 102 further includes a threaded aperture 144 for receiving the screw 118. When in an assembled state (as shown in FIG. 3B) the screw 118 extends through an aperture in the center of the footpad 104a and is screwed into the threaded aperture 144 to secure the footpad 104a to the base 102. The tab 140 engages the notch 142 of the footpad 104a to prevent the footpad 104a from rotating with respect to the base 102 during normal usage of the walking air 100 (when the footpad 104a is affixed to the base 102). As such, the supplemental anti-rotation features 140 and 142 mate with one another to reduce the likelihood of unintended rotation of the footpad 104a, which might otherwise potentially cause the screw 118 to loosen and the footpad 104a to detach from the base 102. Here, the supplemental anti-rotation features 140 and 142 improve the performance and safety of the walking aid 100 by reducing the likelihood of a potentially unsafe walking condition for a user of the walking aid 100. Each of the footpads 102b and 102c can include notches similar to the notch 142 for engaging additional tabs extending from the base 102 to similarly prevent the footpads 102b and 102c from unintentionally rotating with respect to the base 102. FIG. 3B shows the footpad 104a and the base 102 in an assembled state with the screw 118 securing the footpad 104a to the base 102. As shown in FIG. 3B, when the footpad 104a is affixed to the base 102, the tab 140 engages the notch 142 to prevent unintended rotation of the footpad 104a.

Figure 4A:
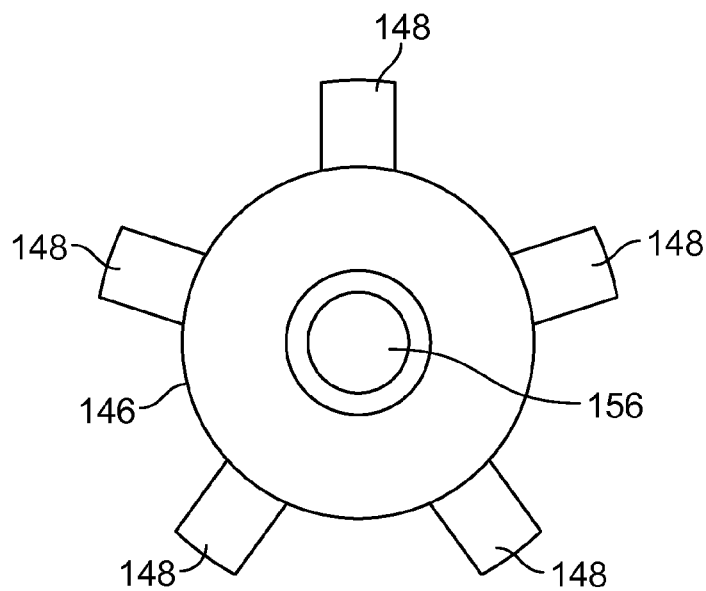
FIG. 4A shows a top down view of an example securing nut for securing a base of a walking aid to a shaft of the walking aid.
Figure 4B:
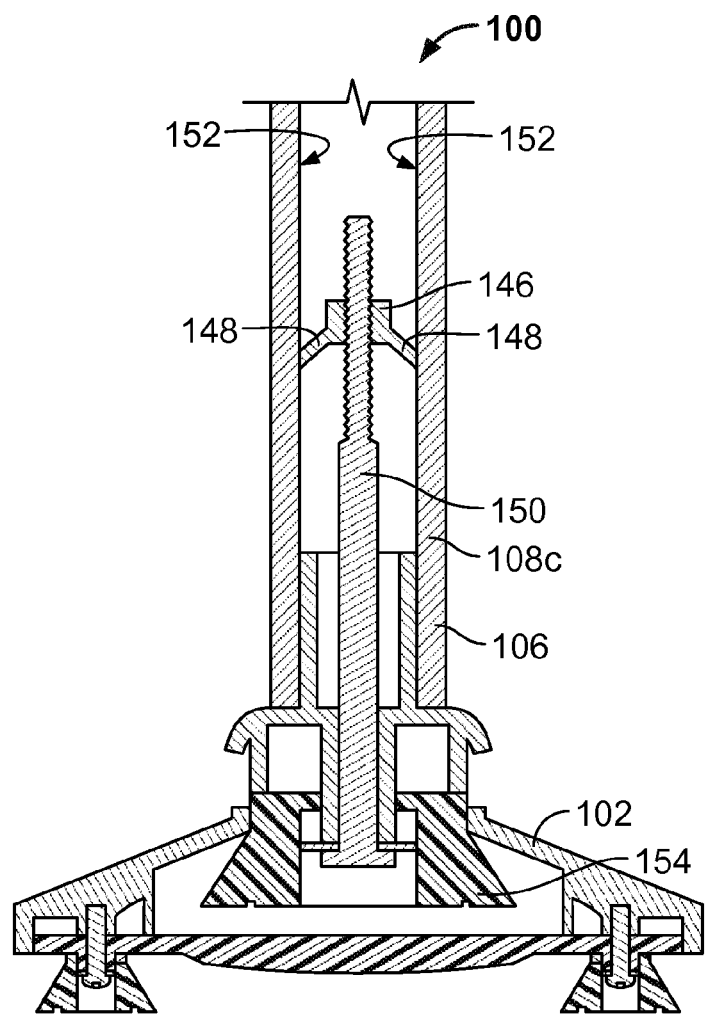
FIG. 4B shows a cross section view of the example securing nut of FIG. 4B securing a base of a walking aid to a shaft of the walking aid.

Referring to FIGS. 4A and 4B, some embodiments of the walking aid 100 can include an improved mechanism for mounting the base 102 with the shaft 106. In this embodiment, a securing nut 146 is configured to couple with a bolt 150 to secure the base 102 of walking aid 100 to the shaft 106 of the walking aid 100. The securing nut 146 includes wings 148 that extend from a center portion of the securing nut 146 and engage an inner wall 152 of the shaft 106. As shown in the cross section view depicted in FIG. 4B, the wings 148 are configured to dig into the material of the shaft 106 to anchor the securing nut 146 within the shaft 106. The bolt 150 can, for example, extend through a flexible puck 154 located within the base 102 and extend into the shaft 106 to engage the securing nut 146. The bolt 150 is screwed into a threaded aperture 156 of the securing nut 146. As the bolt 150 is tightened, the tension on the securing nut 146 causes the wings 148 to propel out radially and dig into the material of the inner wall 152 of the shaft 106 to secure the securing nut 146 in place and to hold the base 102 in place with respect to the shaft 106. The wings 148 prevent the securing nut (and by extension, the bolt 150 and the base 102) from moving with respect to the shaft 106. In the example shown, the securing nut 146 has five wings 148, but other embodiments can include more or less wings 148.

Figure 4C:
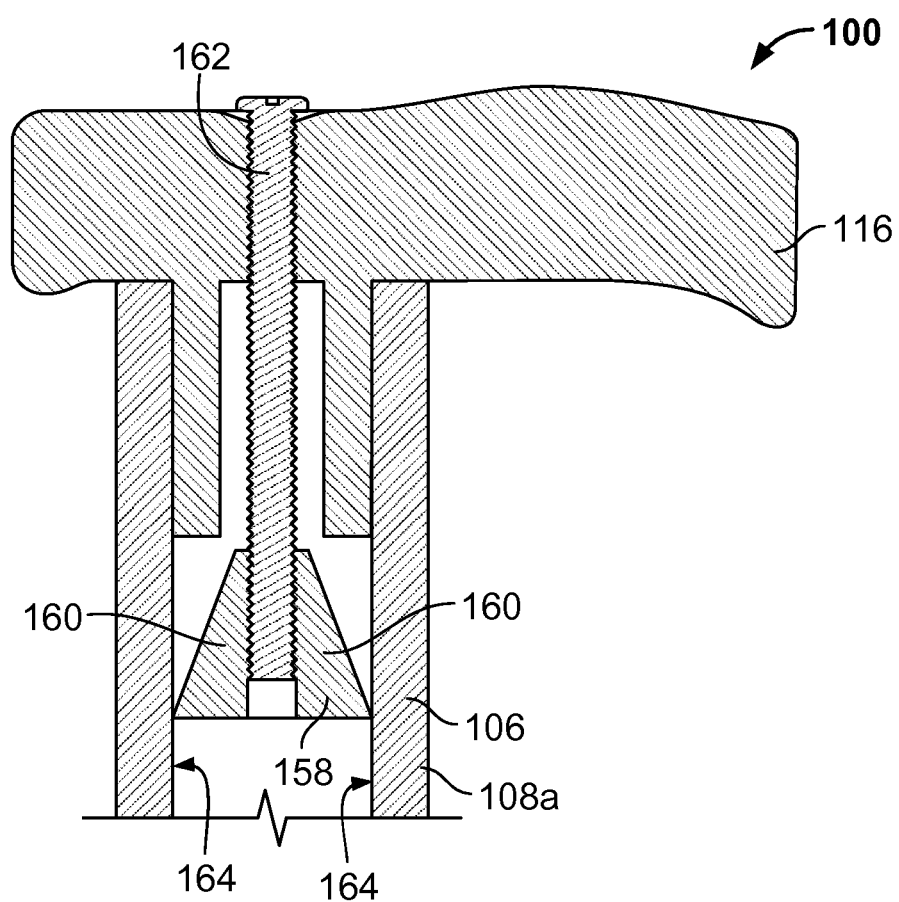
FIG. 4C shows a cross section view of an example finned nut for securing a handle of a walking aid to a shaft of the walking aid.

Referring to FIG. 4C, some embodiments of the walking aid 100 can include an improved mechanism for mounting the handle 116 with the shaft 106. In this embodiment, a finned nut 158 for securing the handle 116 of the walking aid 100 to the shaft section 108a of the walking aid 100. The finned nut 158 includes fins 160 that extend radially outward to engage an inner wall 164 of the shaft section 108a. A bolt 162 extends through at least a portion of the handle 116, extends into the shaft section 108a, and engages a threaded aperture of the finned nut 158. As the bolt 162 is screwed into the finned nut 158, the fins 160 expand radially outward to dig into the material of the inner walls 164 of the shaft section 108a to securely hold the handle 116 in place with respect to the shaft section 108a. The fins 160 engage the inner walls 164 to prevent the finned nut 158 (and by extension the bolt 162 and the handle 116) from moving with respect to the shaft section 108a.

Figure 5A:
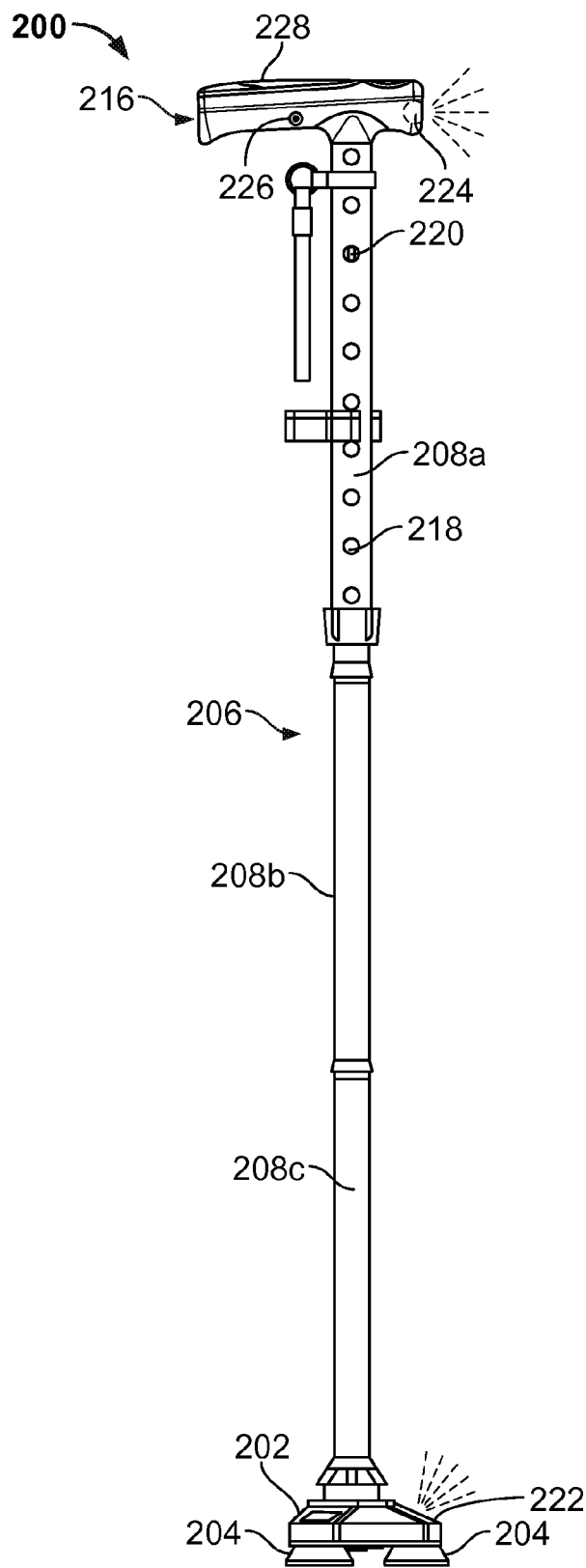
FIG. 5A is a side view of an example walking aid including lights, a light sensor, and a contact detection pad.
Figure 5B:
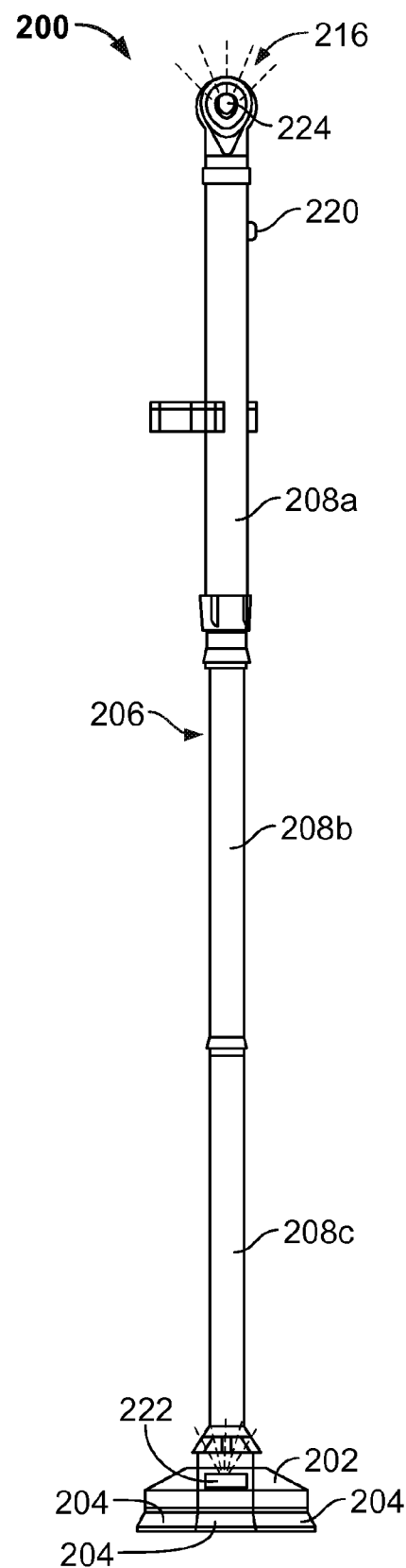
FIG. 5B is a front view of the example walking aid of FIG. 5A.
Figure 5C:
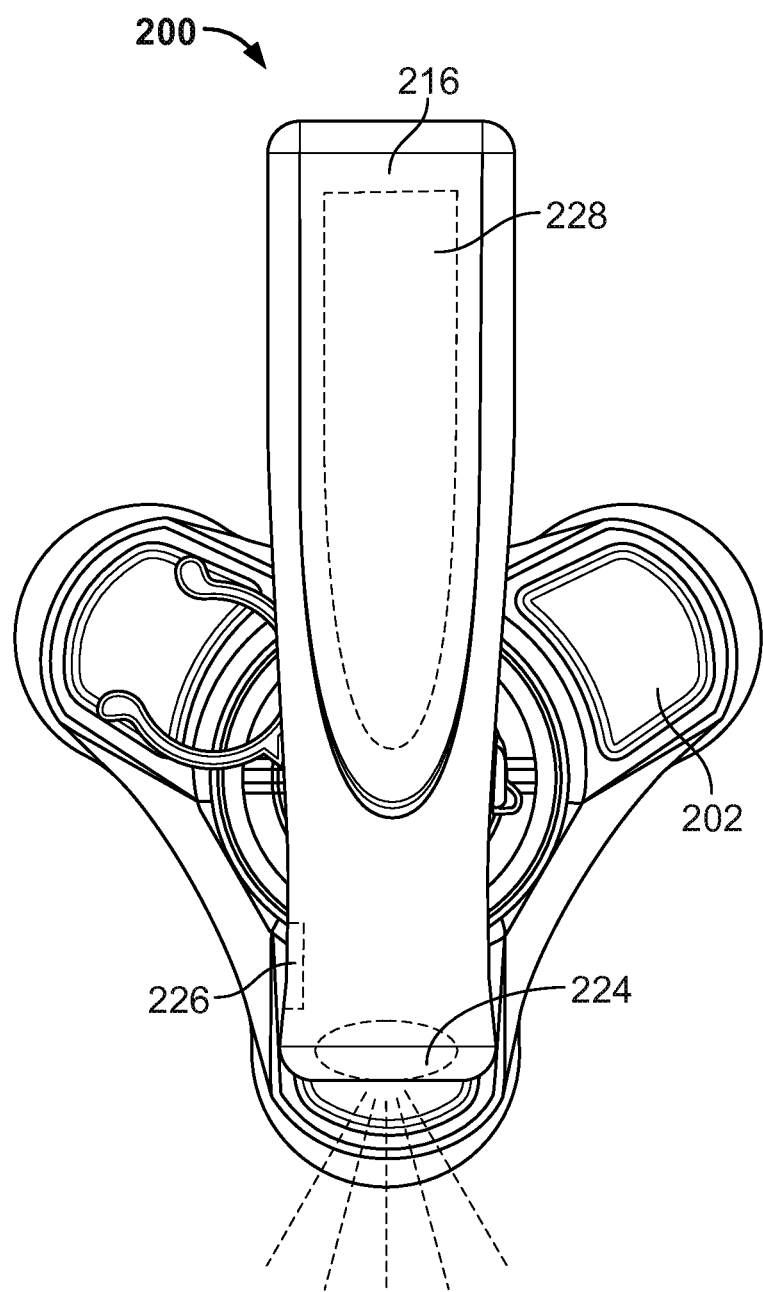
FIG. 5C is a top view of the example walking aid of FIG. 5A.

Referring now to FIGS. 5A-5C, particular embodiments of a walking aid can be further equipped with features that improve user safety and that enhance convenience for the user during usage of the walking aid. For example, a walking aid 200 can optionally include includes a light configured to illuminate a walking path of a user of the walking aid 200. Similar to the previously described embodiment of the walking aid 100 (FIGS. 1A-D), the walking aid 200 depicted here can include a base 202 with footpads 204, a shaft 206 having three shaft sections 208a-c, and a handle 216. The shaft walking aid 200 can further include a depressible button 220 to mate with a plurality of holes 218 to allow the walking aid to be extended and retracted to adjust the shaft 216 to different user-selected heights, as discussed above with reference to FIGS. 1A-1D. Similar to previously described embodiments, the walking aid 200 can further include a flexible joint member (such as the flexible puck as described below in connection with FIG. 6) at the junction of the shaft 206 and the base 202 to allow a degree of flexibility between the shaft 206 and the base 202 such that the shaft 206 can form a non-perpendicular angle with a support surface when the footpads 204 are flush with the support surface. In some embodiments, the walking aid 200 can also include a cable extending through internal cavities of the shaft sections 208a-c to hold the shaft sections 208a-c together in the operative configuration shown in FIGS. 5A and 5B, as discussed above with reference to FIGS. 1A-1B.

In this embodiment, the light 222 of the walking aid 200 is located at the base 202 to light a walking path of a user of the walking aid 200. The walking aid 200 further includes a light 224 located in the handle 216 for lighting a path of the user of the walking aid 200, or for assisting the user in locating objects or performing tasks in the dark. In some embodiments of the walking aid 200, the walking aid 200 includes only one of the lights 222 and 224. In some embodiments, the walking aid 200 includes neither of the lights 222 and 224.

Optionally, the walking aid 200 can further include a light sensor 226 for detecting a level of environmental light 226 in an area around the walking aid 200. Control circuitry housed within the handle 216 or another portion of the walking aid 200 can interpret electrical signals received from the light sensor 226 to determine a level of environmental light. The control circuitry can compare the detected level of environmental light to a threshold value to determine if one or both of the lights 222 and 224 should be turned on. For example, if the light level drops below a set value, the control circuitry can cause the lights 222 and 224 to turn on to aid the user of the walking aid 200. In some implementations, the light sensor 226 is located in a different location than that shown in the example illustrated in FIG. 5A to prevent the light sensor 226 from being accidently obscured by the user's hand when the user grips the handle 216. For example, the light sensor 226 can be located in the base 202 or along the shaft 206.

The walking aid 200 can optionally include a contact detection pad 228 in the handle 216. The contact detection pad 228 can be configured to detect when a user's hand is in contact with the handle 216. The control circuitry can receive electrical signals from the contact detection pad 228 that indicate when a user is in contact with the contact detection pad 228. The control circuitry can use this information to control when the lights 222 and 224 are turned on. For example, the control circuitry can control the lights 222 and 224 such that they only turn on when a user is in contact with the contact detection pad 228. As another example, the control circuitry only turns on the lights 222 and 224 when environmental light detected by the light sensor 220 is below a threshold level and a user is in contact with the contact detection pad 228. In some implementations, the contact detection pad 228 is located in a different location than that shown in the example illustrated in FIG. 5A. For example, the contact detection pad 228 can be located on an underside of the handle 216. In some implementations, one or more physical switches can be included in the handle 116 or another portion of the walking aid 100 for controlling activation of the lights 222 and 224. The physical switches can be used in place of or in addition to the contact detection pad 228 and the light sensor 220 for controlling activation of the lights 222 and 224.

In some embodiments, the walking aid 200 can include one or more other lights in addition to or in place of the lights 222 and 224. For example, the walking aid 200 can include a light in the bottom of the base 202 that shines in a direction that is more or less parallel to the shaft 206. This can allow a user to use the walking aid 200 like a flashlight by picking up the walking aid 200 to shine the light in the bottom of the base 202 on objects.

Referring to FIG. 6, some embodiments of a walking aid 300 can be provided as part of a system 300 that provides interchangeable parts for the user to customize the walking aid. For example, the system 300 (which can be packaged in a kit) includes components of a base 302 and a shaft 306 that can be used, for example, to construct the base 102 of FIGS. 1A-1D or the base 202 of FIGS. 5A-5C. The base 302 includes a bottom plate 308 and a housing 310 configured to receive the bottom plate 308. A bolt 312 is configured to extend through a washer 314, through a flexible puck 316, through an aperture 318 of the housing 310 and through an engaging portion 320 and into the shaft 306. The bolt 312 can engage a securing nut, such as the securing nut 146 of FIGS. 4A-4B, located within the shaft 306 to secure the base 302 to the shaft 306. The flexible puck 316 is configured to fit within the housing 310, with a portion of the flexible puck 316 extending into the aperture 318 and engaging the engaging portion 320. When the walking aid 300 is in an assembled state, the flexible puck 316 provides flexibility between the base 302 and he shaft 306 to permit the shaft 306 to form non-perpendicular angles with the base 302.

The bottom plate 308 is configured to mate with the housing 310 to enclose the flexible puck 316 (as well as the washer 314 and portions of the bolt 312) within the housing 310. The bottom plate 308 is secured to the housing 310 by screws 322. The screws 322 also secure the footpads 304a-c to the bottom plate 308. When the base 302 is in an assembled state, the screws 322 extend through apertures of the footpads 304a-c, through apertures 324 of the bottom plate 308, and thread into threaded apertures 326 of the housing 310. In some embodiments, the bottom plate 308 includes tabs 328 configured to engage notches of the footpads 304a-c to prevent unintended rotation of the footpads 304a-c with respect to the bottom plate 308 as described above with reference to FIGS. 3A-3B.

Optionally, the system 300 further includes additional interchangeable flexible joint members (such as pucks 330 and 332) that can be exchanged with another flexible joint member (such as the flexible puck 316) so that a user can customize flexibility of the junction of the base 302 with the shaft 306. For example, the flexible puck 330 can be less flexible than the flexible puck 316. The flexible puck 316 can be removed from the base 302 and replaced by the flexible puck 330 to decrease the flexibility of the junction of the base 302 and the shaft 306. The decreased flexibility of the flexible puck 330 can cause the maximum angle that can be formed by the shaft 306 and the base 302 (when under a given load) to be less than the maximum angle that can be formed by the shaft 306 and the base 302 when the flexible puck 316 is included in the base 302 assembly. As another example, the flexible puck 332 can have greater flexibility than the flexible puck 316. The flexible puck 316 can be removed from the base 302 and replaced by the flexible puck 332 to increase the flexibility of the joint between the shaft 306 and the base 302. This can allow the maximum angle that can be formed by the shaft 306 and the base 302 (when under a given load) to be greater than the maximum angle that can be formed by the shaft 306 and the base 302 when the flexible puck 316 is included in the base 302 assembly. Interchangeable flexible pucks having differing levels of flexibility can be sold in a kit along with a walking aid (e.g. the walking aid 100 of FIGS. 1A-1D). The kit can include the walking aid along with a first flexible puck (e.g., the flexible puck 316) installed in the walking aid and additional flexible pucks (e.g., the flexible pucks 330 and 332) included in the packaging with the walking aid, but external to the walking aid.

Figure 7A:
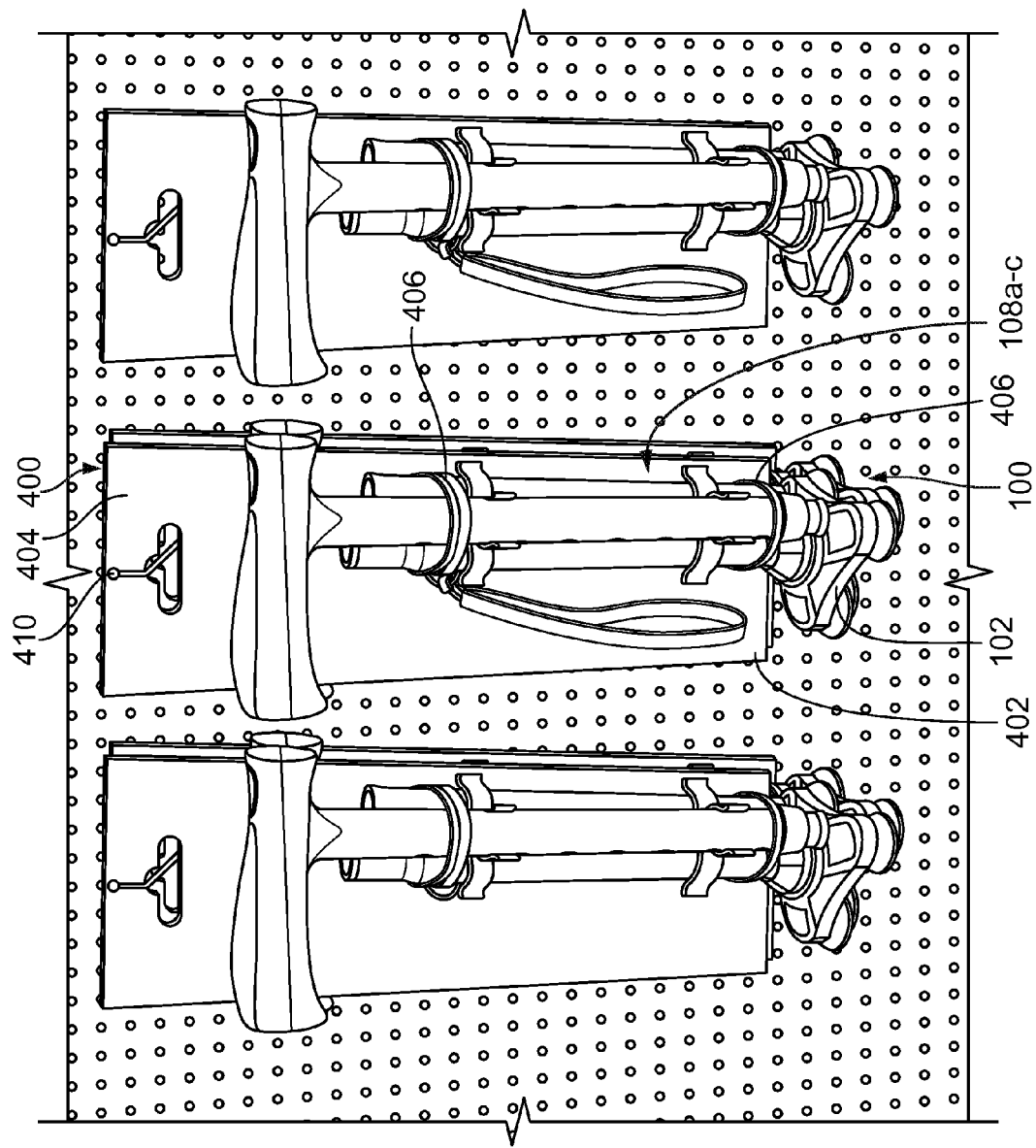
FIG. 7A shows an example walking aid and example packaging for the example walking aid on a hanging display.
Figure 7B:
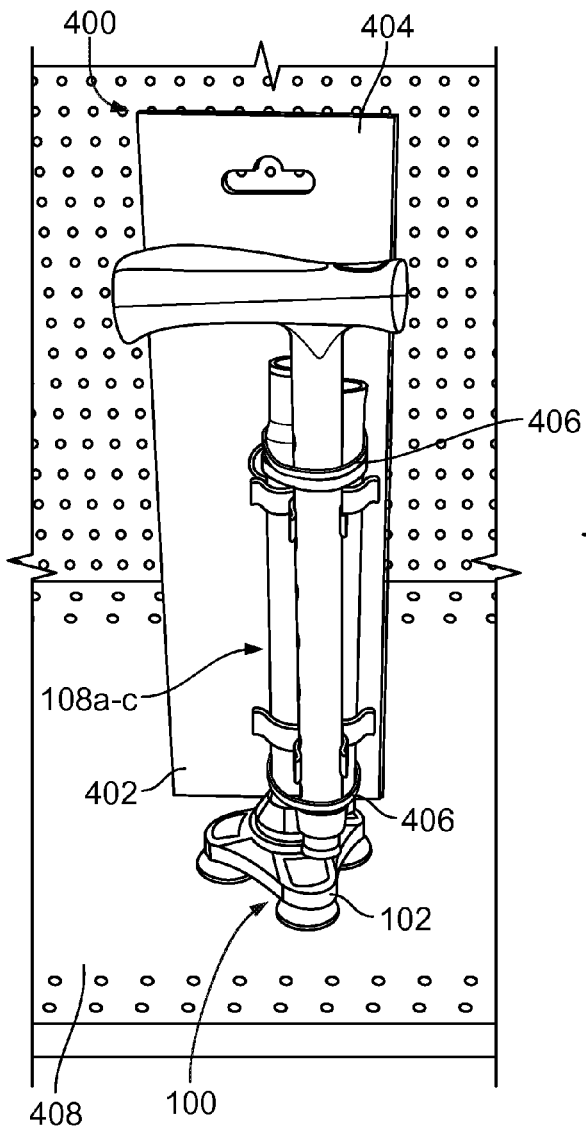
FIG. 7B shows the example walking aid and example packaging for the example walking aid of FIG. 7A on a shelf display.
Figure 7C:
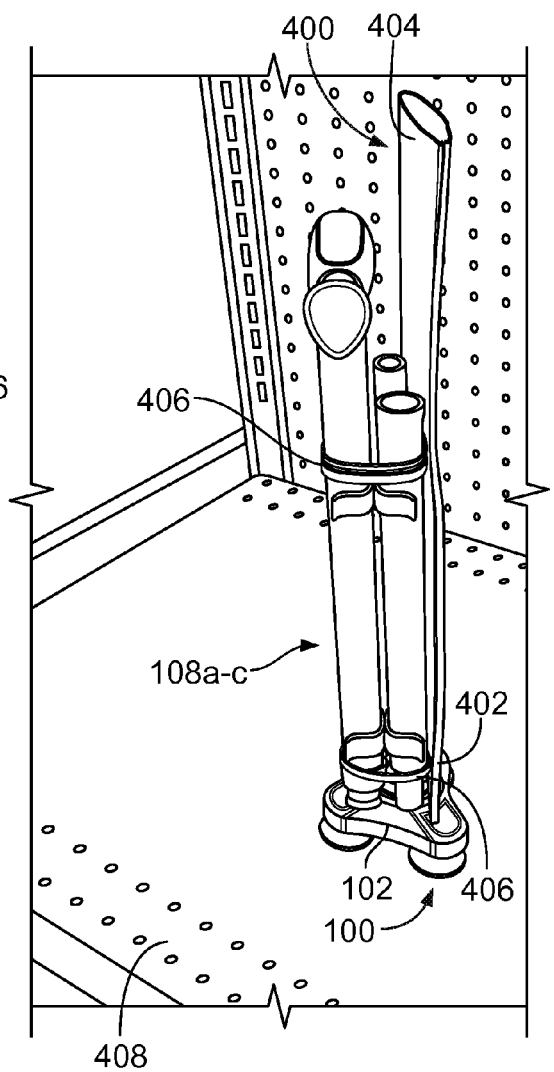
FIG. 7C shows a side perspective view of the example packaging and example walking aid of FIG. 7A on a shelf display.

Referring now to FIGS. 7A-7C, some embodiments of the walking aid can be packaged in a collapsed configuration that permits multiple display options for presentations to prospective users. For example, the walking aid 100 can be arranged in the collapsed configuration and affixed to packaging 402 such that at least a portion of the base 102 (e.g., at least the footpads) extend below a lowermost edge of the packaging 402. The walking aid 100 and packaging 402 form a complete display kit 400 that can be displayed in a hanging configuration (due to the aperture in the packaging 402 as shown in FIG. 7A) or a standing configuration (due to the base 102 extending below the packaging 402 as shown in FIGS. 7B and 7C). The packaging 402 includes a back panel 404 and fasteners 406 for affixing the walking aid 100 to the back panel 404. The fasteners 406 can be, for example, plastic bands that warp around shaft sections 108a-c of the walking aid 100 and extend through slits of the back panel 404 to secure the walking aid 100 to the back panel 404. As another example, the fasteners 406 can be twist ties that warp around the walking aid 100 and extend through slits in the back panel 404. Ends of the twist ties can be twisted together behind the back panel 404. In the example shown, the packaging 402 includes two fasteners 406, but other embodiments can include more or less fasteners 406.

The walking aid 100 is affixed to the packaging 402 such that the base 102 extends below a lower edge of the back panel 404. This positioning of the walking aid 100 with respect to the back panel 404 allows the display kit 400 to be positioned on a shelf 408 as shown in FIGS. 4B-4C such that the footpads 104a-c are in contact with the shelf 408 and the display kit 400 is fully supported by the base 102. This configuration of the walking aid 100 and packaging 402 further allows the display kit 400 to be hung from a hook 410 to be included as part of hanging display that includes other walking aid display kits. The positioning of the walking aid 100 with respect to the back panel 404 such that the base 102 extends below the lower edge of the back panel 404 allows consumers to manipulate the walking aid 100 while the walking aid 100 is still attached to the packaging 402 to see for themselves how the base 102 engages support surfaces. This can allow consumers to make an informed purchasing decision with regard to the walking aid 100 without having to remove the walking aid 100 from the packaging 402.

In some embodiments, the walking aid 100 is positioned with respect to the packaging 402 such that a portion of the base 102 extends behind a plane defined by the back panel 404, as shown in FIG. 7C. This configuration allows for multiple display kits to be compactly stored on hanging hooks as shown in FIG. 7A while also allowing consumers to observe how the base 102 interacts with support surfaces. In some embodiments, the walking aid 100 extends far enough below the lower edge of the back panel 404 to allow for a degree of flexibility between the shaft section 108c and the base 102 to be observed. This can allow consumers to place the base 102 on a support surface and move the shaft section 108c with respect to the base 102 at one or more non-perpendicular angles to observe the flexible properties of the joint between the shaft section 108c and the base 102.

Figure 8A:
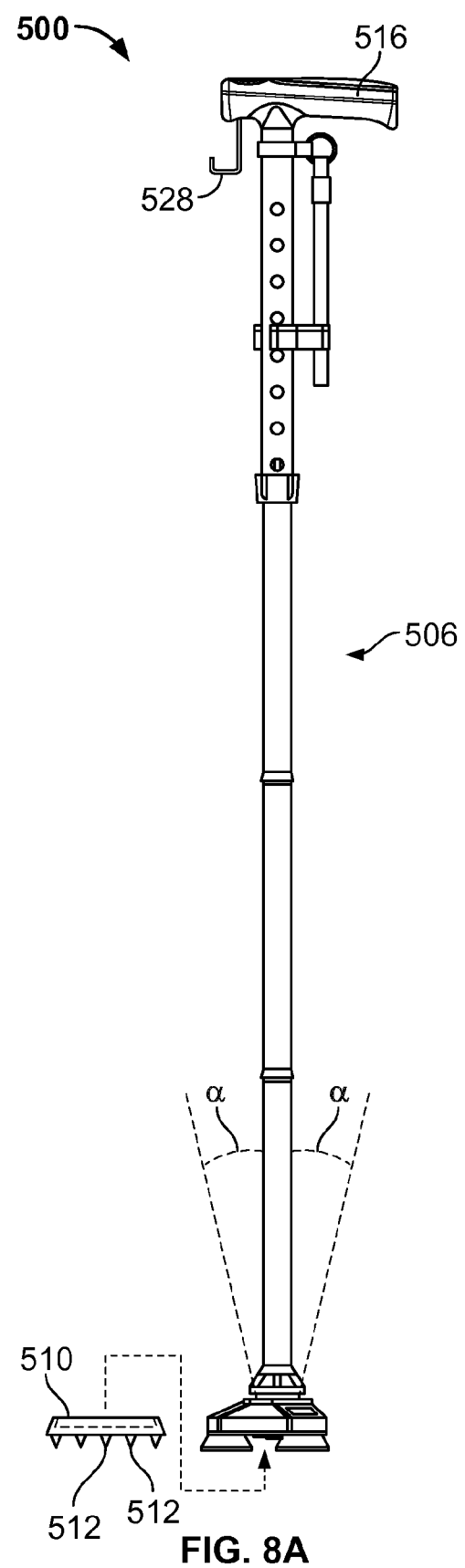
FIG. 8A shows a side view of an example walking aid.
Figure 8B:
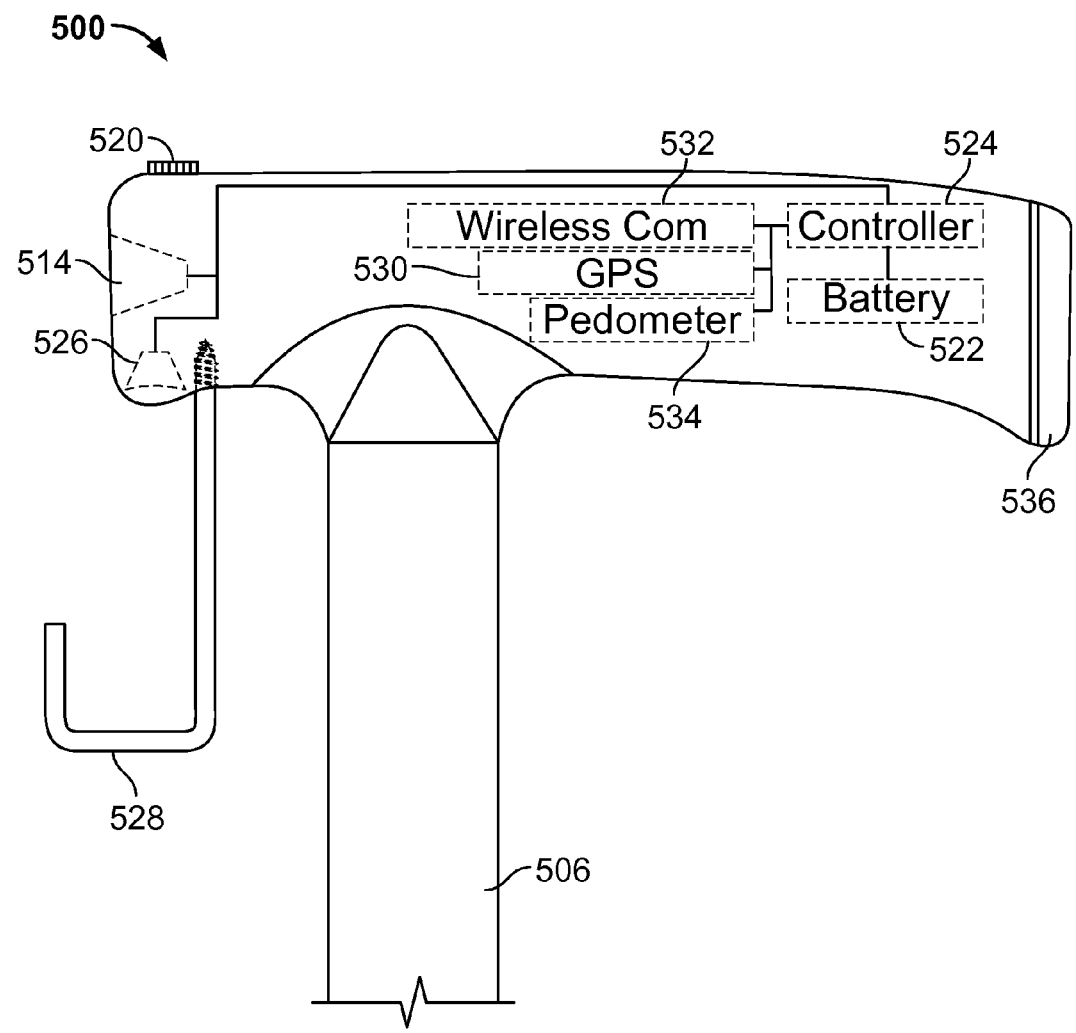
FIG. 8B shows a close up view of a handle and an upper portion of a shaft of the example walking aid of FIG. 8A, including components contained within the handle.

Referring now to FIGS. 8A-B, some embodiments of a walking aid 500 can be equipped with one or more mechanical and/or communication features that provide additional convenience and safety for the user. Such features can be implemented on any of the walking aid embodiments described previously herein. Similar to the previously described embodiments, the walking aid 500 may include a base 502 having footpads 504, a shaft 506 connected to the base 502 and composed of shaft sections 508, and a handle 516 located at the top of the shaft 506. Also, the walking aid 500 can include a flexible joint member (such as the flexible puck housed in the base, as described above with respect to FIGS. 1A-1D and 6) to allow for multiple degrees of freedom (multiple articulation angles) between the base 502 and the shaft 506. For example, a flexible puck can be selected to have flexible properties that allow for a range of motion between the base 502 and the shaft 506 that allows for a maximum off center angle of a for the shaft 506 with respect to the base 102. The angle $\alpha$ can be, for example, between 5 degrees and 45 degrees. As another example, the angle $\alpha$ can be between 10 degrees and 30 degrees. As another example, the angle $\alpha$ can be about 15 degrees. The flexible puck can also be configuration to provide another articulation angle in a plane that is generally perpendicular to the plane of the angle $\alpha$ depicted in FIG. 8A (similar to articulation angles 122 and 123 depicted in FIG. 1A). The second articulation angle (not shown in FIG. 8A) can provide range of motion between the base 502 and the shaft 506 that allows for a maximum off center angle similar to that of angle $\alpha$, or that allows for a maximum off center angle significantly less than that of angle $\alpha$.

Still referring to FIGS. 8A-B, in some embodiments, the footpads 504 can be configured so that a user can exchange with at least one alternative footpad 510 having spiked extensions 512. The spiked extensions 512 can improve surface contact when the walking aid 500 is in use on an uneven support surface such as carpeting, gross, gravel, or mud. For example, the spiked extensions 512 can dig into dirt or mud to improve grip for the walking aid 500 and lead to increased stability for the walking aid 500. In some implementations footpads having varying lengths of spiked extensions can be included in a kit along with the walking aid 500 to allow the footpads having spiked extensions to be swapped out with the footpads 504.

Also, the walking aid 500 can be equipped with a number of mechanical and/or electronic improvements. For example, FIG. 8B shows a close up view of the handle 516, which houses several components that can be optionally included for improving functionality of the walking aid 500. The walking aid 500 can include a light 514 embedded in a front portion of the handle 516. The light 514 can light a path of a user of the walking aid 500 or allow the user to view objects positioned in front of the user. The light can be activated by a light switch 520. The light switch 520 can be, for example, a sliding switch that turns the light 514 on when in a forward position and turns the light 514 off when in a rearward position. The light 514 is powered by a battery 522 located within the handle 516. In some implementations, the battery 522 is located in a position within the walking aid 500 other than the handle 516. In some implementations, the battery 522 is external to the walking aid 500.

In some implementations, the handle 516 also houses electrical control circuitry 524 for controlling operation of the light 514 and potentially other electronic components of the walking aid 500. For example, the control circuitry 524 can receive a signal from the switch 520 and cause the light 514 to turn on in response to receiving the signal from the switch 520. As another example, the control circuitry 524 can use signals received from one or more lights sensors and/or one or more contact detection pads to generate control signals for activating and deactivating the light 514.

Optionally, the walking aid 500 can include an audio speaker 526 for emitting sounds in response to user input. The speaker 526 can, for example, output a panic alarm that can be activated by the user of the walking aid 500 in order for the user to call for help. In this example, the speaker 526 can be activated in response to the user flipping a switch embedded in the handle 516 be switched into the on position. As another example, the speaker 526 can be activated in response to the user pressing a button located on the walking aid 500. The user can use the speaker to call for assistance. For example, if the user falls down, the user can press a button on the walking aid 500 to activate the speaker 526 and call for help.

Additionally, the walking aid 500 can optionally include a hook 528 extending from a forward portion of the handle 516 to assist a user of the walking aid 500 in carrying objects. For example, one or more grocery bags can be hung from the hook 528 to free up the user's hands during usage of the walking aid 500. The hook 528 can help users conduct daily activities with a greater degree of freedom by allowing users to perform tasks without assistance from others. The hook 528 can allow some or all of the weight of items (e.g., bags) hung from the hook 528 to be supported by the walking aid 500 rather than requiring the user to support the weight of the items.

In another optional embodiment, the walking aid 500 can include a spot-GPS transponder for determining a geographic location of the walking aid 500 using GPS signals received from GPS positioning satellites. In some implementations, the walking aid 500 can include a location determining transponder that determines location using techniques other than GPS location (e.g., communications tower triangulation). The spot-GPS transponder 530 can be controlled by the control circuitry 524 and receive power from the battery 522. The walking aid 500 can further include a wireless communication device 532 for communicating with external computing devices. The wireless communication device 532 can, for example, communicate location data collected by the spot-GPS transponder 530 to a remote server. This location information can then be used, for example, to identify a location of a user of the walking aid 500. For example, a family member of the user or a healthcare worker responsible for the user can access the remote server to determine the location of the walking aid 500 and therefore determine the location of the user of the walking aid 500. The wireless communication device 532 can be powered by the battery 522 and can receive control signals from the control circuitry 524.

In some implementations, location data collected by the spot-GPS transponder 530 can be used by the user of the walking aid 500 to track exercise. For example, the user can download location data collected by the spot-GPS transponder 530 using the wireless communication device 532 to track the distance he has walked during a particular time frame (e.g., track daily walking distance, weekly walking distance, etc.). In some implementations, instead of or in addition to the spot-GPS transponder 530, the walking aid 500 includes a pedometer 534 for tracking steps of the user of the walking aid 500. The pedometer 534 can be powered by the battery 522 and controlled by the control circuitry 524. Information on the user's steps can be downloaded from the pedometer 534 to an external device (e.g., a personal computer) using the wireless communication device 532. The user can use this information to track the distance he has walked during a particular time frame.

Stiff referring to FIG. 8B, the walking aid 500 may include a removable cap 536 at an exposed end of the handle 516 to allow a user or repair worker to access electronic components housed within the handle 516 (e.g., the control circuitry 524, the battery 522, the spot-GPS transponder 530, the wireless communication device 532, the pedometer 534 and/or other electronic components housed within the handle 516. The removable cap 536 can be releasably affixed to the handle 516, for example, by a threaded connection or by a friction connection.

A number of embodiments of the invention have been described. Nevertheless, it will be understood that various modifications may be made without departing from the scope of the invention. For example, the walking aid 100 of FIGS. 1A-1D can include more or less shaft sections or more or less footpads. Other variations are also possible while staying within the spirit and scope of the invention. Accordingly, other embodiments are within the scope of the following claims.

What is claimed is:

1. An apparatus for aiding walking along a surface, comprising:
   a handle for engaging a hand of a user of the apparatus;
   a shaft coupled to the handle at a first end and extending away from the handle, the shaft including one or more shaft sections;
   a base coupled to the shaft at a second end of the shaft, the base having an upper housing and a lower housing that define an internal cavity therebetween;
   three flexible footpads mounted to a main body of the base and configured to interface with the surface, each footpad having concentric rings of raised and recessed portions, the three flexible footpads arranged substantially equidistant from a central axis of the internal cavity of the base such that the three flexible footpads form a substantially equilateral triangle;
   an elastically bendable member at least partially enclosed within the internal cavity of the base such that an axis of the elastically bendable member is generally aligned with a central axis of the internal cavity of the base;
   a fastener extending along the axis of the elastically bendable member and through at least a portion of the base so as to coupled the base and the elastically bendable member to a lowermost shaft section of the shaft;
   wherein the fastener includes: (i) a bolt extending along the axis of the elastically bendable member and through at least a portion of the base, and (ii) at least one securing nut disposed within a lowermost shaft section of the shaft, the at least one securing nut affixed to the bolt and configured to engage an inner wall of the lowermost shaft section to secure the base to the lowermost shaft section.

2. The apparatus of claim 1, wherein at least one recessed portion of each footpad is defined by at least two raised portions of each footpad.

3. The apparatus of claim 1, wherein each footpad contacts a portion of the base so as to restrict rotation of each footpad.

4. The apparatus of claim 1, wherein the elastically bendable member biases the shaft to a first orientation relative to the base and elastically flexes in response to pivoting movement of the shaft from the first orientation to a second orientation relative to the foot.

5. The apparatus of claim 1, wherein the elastically bendable member is located between the upper housing and the lower housing.

6. The apparatus of claim 5, wherein a bottom portion of the fastener extends below the elastically bendable member.

7. The apparatus of claim 6, wherein the bottom portion of the fastener is disposed within the internal cavity defined by the upper housing of the base and the lower housing of the base.

8. The apparatus of claim 1, wherein the fastener is configured to impart torque upon the elastically bendable member in response to an angular movement of the shaft with respect to the base.

9. The apparatus of claim 8, wherein at least a portion of the elastically bendable member is configured to elastically compress in response to the angular movement of the shaft with respect to the base.

10. The apparatus of claim 1, wherein the at least one securing nut engages the inner wall of the lowermost shaft section by digging into material of the lowermost shaft section to anchor the at least one securing nut within the lowermost shaft section.

11. The apparatus of claim 10, wherein the at least one securing nut digs into the material of the lowermost shaft section in response to tension created by tightening of the bolt.

12. The apparatus of claim 1, wherein:
   the shaft comprises three shaft sections configured to detachably release from each other; and
   the apparatus is configured to fold into a collapsed configuration in which central axes of each of the shaft sections are substantially parallel and not aligned, wherein the handle is positioned at a top portion of the apparatus and the base is positioned at a bottom portion of the apparatus when the apparatus is in the collapsed configuration.

13. The apparatus of claim 12, further comprising an attaching member configured to engage each of the three shaft sections and secure the three shaft sections to each other when the apparatus is in the collapsed configuration.

14. An apparatus for aiding walking along a surface, comprising:
- a handle for engaging a hand of a user of the apparatus;
- a shaft coupled to the handle at a first end and extending away from the handle, the shaft including one or more shaft sections;
- a base coupled to the shaft at a second end of the shaft, the base having an upper housing and a lower housing that define an internal cavity therebetween;
- three flexible footpads mounted to a main body of the base and configured to interface with the surface, each of the three flexible footpads having concentric rings of raised and recessed portions;
- an elastically bendable member at least partially enclosed within the internal cavity of the base such that an axis of the elastically bendable member is generally aligned with a central axis of the internal cavity of the base;
- a fastener extending along the axis of the elastically bendable member and through at least a portion of the base so as to couple the base and the elastically bendable member to a lowermost shaft section of the shaft;

wherein the fastener includes: (i) a bolt extending along the axis of the elastically bendable member and through at least a portion of the base, and (ii) at least one securing nut disposed within a lowermost shaft section of the shaft, the at least one securing nut affixed to the bolt and configured to engage an inner wall of the lowermost shaft section to secure the base to the lowermost shaft section;

wherein the at least one securing nut engages the inner wall of the lowermost shaft section by digging into material of the lowermost shaft section to anchor the at least one securing nut within the lowermost shaft section.

* * * * *